United States Patent
Lin

(10) Patent No.: US 8,472,087 B2
(45) Date of Patent: Jun. 25, 2013

(54) OFFICE MACHINE WITH BOTH PLATFORM-TYPE SCANNING MODE AND FEEDER-TYPE SCANNING MODE

(75) Inventor: Yen-Chun Lin, Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 1213 days.

(21) Appl. No.: 12/081,418

(22) Filed: Apr. 16, 2008

(65) Prior Publication Data
US 2009/0237753 A1    Sep. 24, 2009

(30) Foreign Application Priority Data
Mar. 21, 2008   (TW) ............................. 97110135 A

(51) Int. Cl.
*H04N 1/04*    (2006.01)
(52) U.S. Cl.
USPC ............ 358/474; 358/494; 358/497; 358/498

(58) Field of Classification Search
USPC .......................... 358/494, 474, 496, 497, 498
See application file for complete search history.

(56) References Cited

U.S. PATENT DOCUMENTS

| 2003/0227654 A1* | 12/2003 | Shiraishi ...................... 358/474 |
| 2007/0003352 A1* | 1/2007 | Koga et al. .................... 400/582 |

FOREIGN PATENT DOCUMENTS

| TW | 093124115 | 10/2005 |
| TW | 092118103 | 12/2005 |
| TW | 095107505 | 1/2007 |

\* cited by examiner

*Primary Examiner* — Houshang Safaipour
(74) *Attorney, Agent, or Firm* — Jianq Chyun IP Office

(57) ABSTRACT

An office machine with both platform-type scanning mode and feeder-type scanning mode. The office machine includes a reciprocally movable scanning module arranged on upper side of the office machine for scanning documents placed on a platform. The office machine further includes a sheet-feeding path positioned under a bed. The sheet-feeding path has at least one position where the documents passing through the sheet-feeding path can be scanned by the scanning module.

14 Claims, 6 Drawing Sheets

OFFICE MACHINE WITH BOTH PLATFORM-TYPE SCANNING MODE AND FEEDER-TYPE SCANNING MODE

BACKGROUND OF THE INVENTION

The present invention is related to an office machine with both platform-type scanning mode and feeder-type scanning mode. The office machine includes a reciprocally movable scanning module arranged on upper side of the office machine for scanning a document placed on a platform. The office machine further includes a sheet-feeding path in which a document can pass through the scanning module to be single-face/double-face scanned.

Taiwanese Patent No. 93124115 discloses a platform-type scanner as shown in FIG. 1. The platform-type scanner includes a housing r having a platform r1. A platform-type scanning module D is reciprocally movably arranged inside the housing r. A document can be placed on the platform r1 to be scanned by the platform-type scanning module D.

Taiwanese Patent No. 95107505 discloses a single-face/double-face continuous automatic paper feeder as shown in FIG. 2. The automatic paper feeder includes a paper-feeding cartridge g and a paper-releasing cartridge g1. Papers can be placed on the paper-feeding cartridge g. A paper p goes through a pick roller h into a paper-feeding passage or a first passage k1. Then the paper p goes through a roller set h1 to push away a leaf spring n1. Then a front face of the paper p passes through a scanning module D. Then the paper p goes through a roller set h2 into a paper-returning passage or a second passage k2. In case of single-face scanning, a guide member m1 is switched to a position as shown by phantom line to unblock a subsidiary passage k4, permitting the paper p to get into the subsidiary passage k4 and push away a leaf spring n2. Then a roller set h3 delivers the paper p to the paper-releasing cartridge g1.

In case of double-face scanning, the guide member m1 is positioned in a position as shown by solid line to block the subsidiary passage k4. Under such circumstance, the paper p goes through the paper-returning passage or the second passage k2 and goes through the roller set h4 to push away the leaf spring n3. Then the back face of the paper p passes through the scanning module D. Then the paper p gets into the paper-releasing passage or the third passage k3 and goes through the roller sets h5, h3 to the paper-releasing cartridge g1. At this time, the paper is double-face scanned. In a modified embodiment, the scanning module D is replaced with a printing module.

Taiwanese Patent No. 92118103 discloses an automatic sheet-feeding apparatus including a sheet-feeding cartridge a and a sheet-releasing cartridge a1. Papers can be placed on the sheet-feeding cartridge a. A paper p goes through a pick roller c and a roller set c1 into a first passage b1. A front face of the paper p passes through a scanning module D and then moves to a first register section e1. A guide member f1 is switched to a position as shown by phantom line to block the first passage b1 and unblock a second passage b2. The paper p goes through a roller set c2 into the second passage b2 and then goes through the roller set c1 into the first passage b1 again. A back face of the paper p then passes through the scanning module D. A guide member f2 is switched to a position as shown by phantom line to unblock the subsidiary passage b4, permitting the paper p to get into a second register section e2. Then the guide member f3 blocks the subsidiary passage b4 and unblocks the third passage b3, whereby a roller set c3 drives the paper p into the third passage b3. Then a roller set c4 delivers the paper p to the releasing cartridge a1. At this time, the paper is double-face scanned. In a modified embodiment, the scanning module D is replaced with a printing module.

In fact, as shown in FIG. 3, the automatic sheet-feeding apparatus of Taiwanese Patent No. 92118103 is a feeder-type scanning apparatus. When co-used with a platform D1, some problems appear. For example, when delivering the paper p, in case the scanning module D is reciprocally moved as a platform-type scanner, the scanning effect will be affected. Moreover, the paper-feeding path of the automatic sheet-feeding apparatus, including first passage b1, second passage b2 and third passage b3, is not optimally adapted to the scanning module D. When the scanning module D is moved rightward as shown by the phantom line of FIG. 3, the paper p cannot be fully scanned. In the case that the paper p is placed on the platform D1 to be scanned, the office machine will have a considerable length (or width) as shown in FIG. 3. This leads to trouble in transfer and location of the office machine, especially in a relatively small office.

Therefore, while having both combining platform-type scanning mode and feeder-type scanning mode, the conventional office machine has some shortcomings that should be overcome. For example, the sheet-feeding path is too long and the structure is too complicated.

Therefore, it is tried by the applicant to provide an office machine having both platform-type scanning mode and feeder-type scanning mode without increasing the length or width. Also, the sheet-feeding path of the office machine is simplified.

SUMMARY OF THE INVENTION

It is therefore a primary object of the present invention to provide an office machine with both platform-type scanning mode and feeder-type scanning mode. The office machine includes a reciprocally movable scanning module arranged on upper side of the office machine and a platform on which a document or a paper can be placed. The scanning module is able to reciprocally move for scanning the document or the paper placed on the platform.

It is a further object of the present invention to provide the above office machine which further includes a sheet-feeding path positioned under the scanning module. The sheet-feeding path has at least one position where the document or the paper can be scanned by the scanning module.

It is still a further object of the present invention to provide the above office machine in which the sheet-feeding path includes a first passage, a second passage communicating with the first passage and a subsidiary passage positioned between the first and second passages. A document or a paper is selectively delivered through the first passage, the second passage and/or the subsidiary passage to be single-face/double-face scanned/printed.

The present invention can be best understood through the following description and accompanying drawings wherein:

DETAILED DESCRIPTION OF THE PREFERRED EMBODIMENTS

Figure 1:
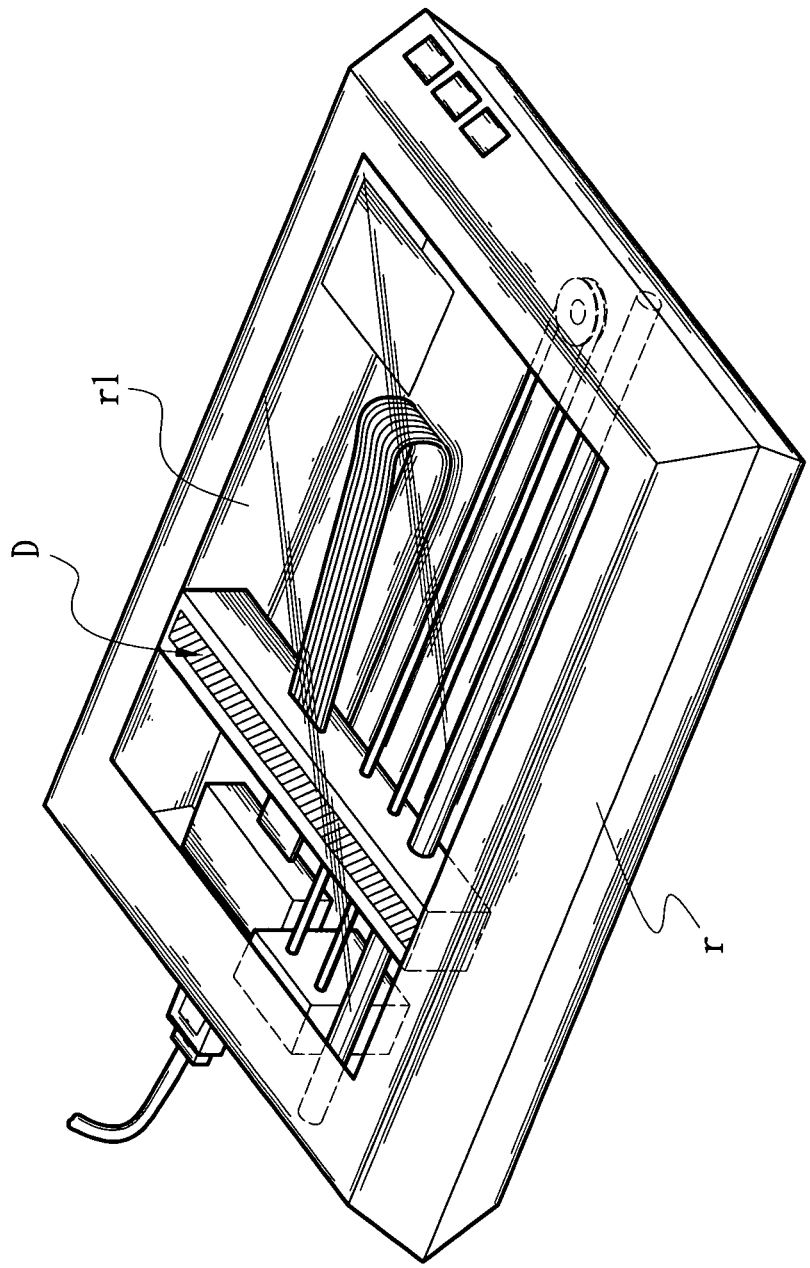
FIG. 1 is a perspective view of a conventional platform-type scanner.
Figure 2:
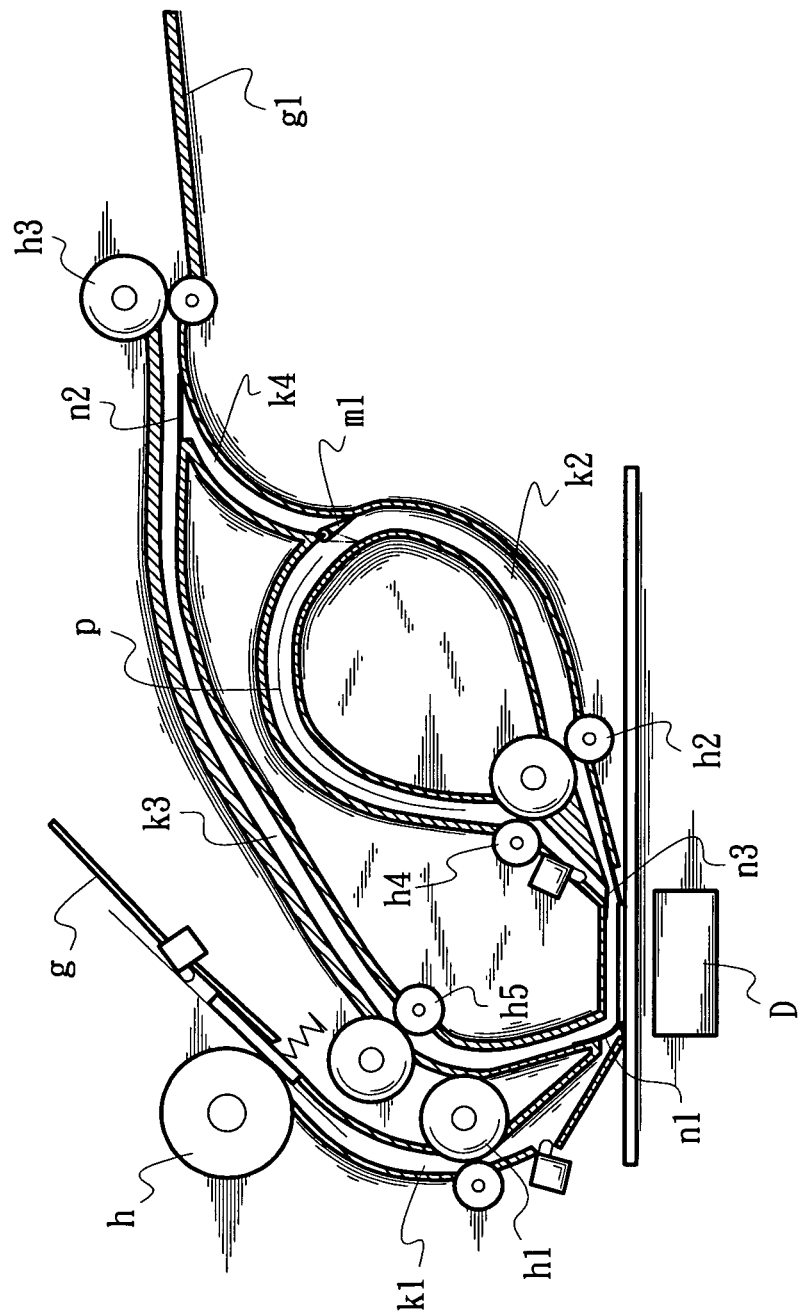
FIG. 2 is a side view of a conventional automatic sheet feeder.
Figure 3:
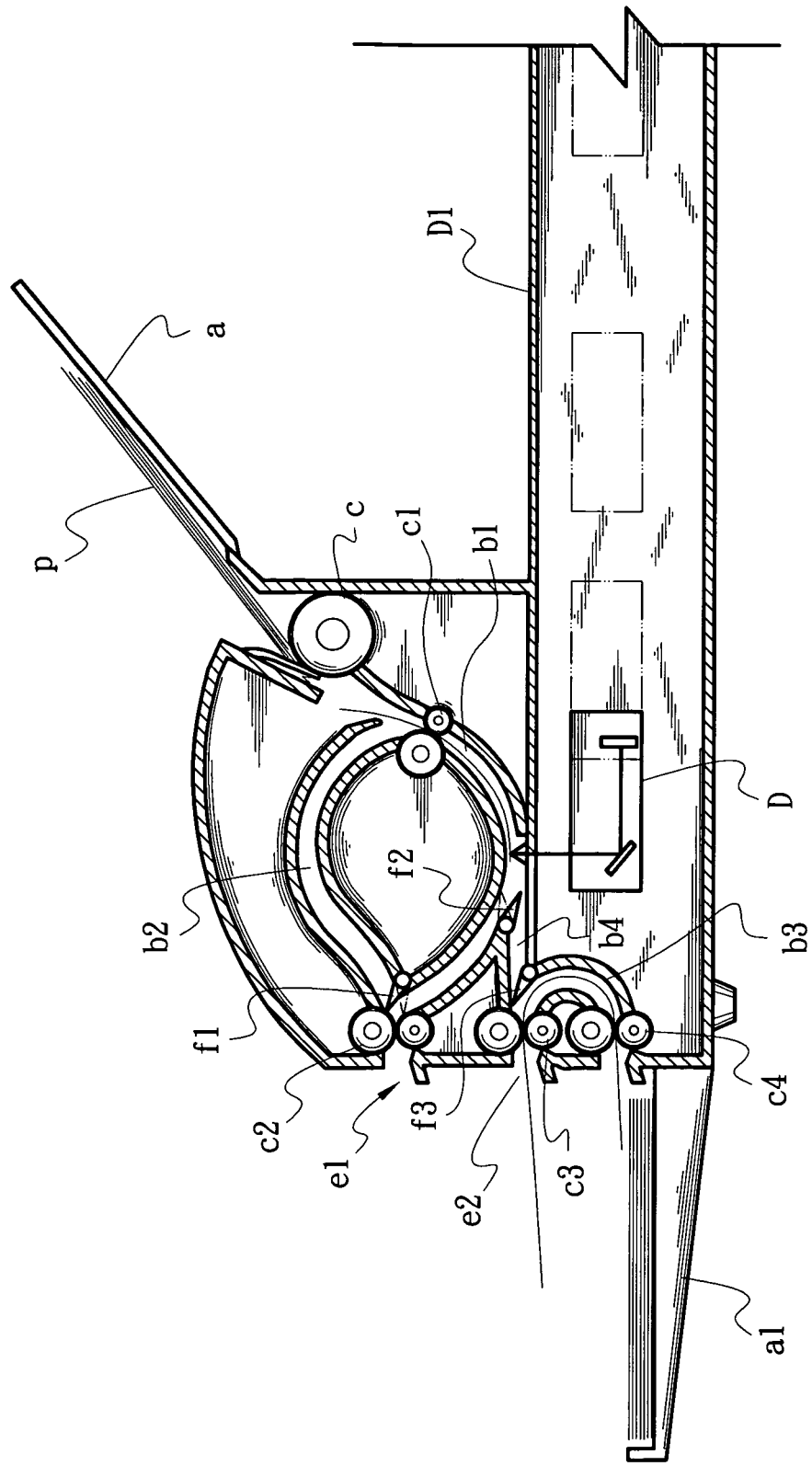
FIG. 3 is a side view of another conventional automatic sheet feeder.
Figure 4:
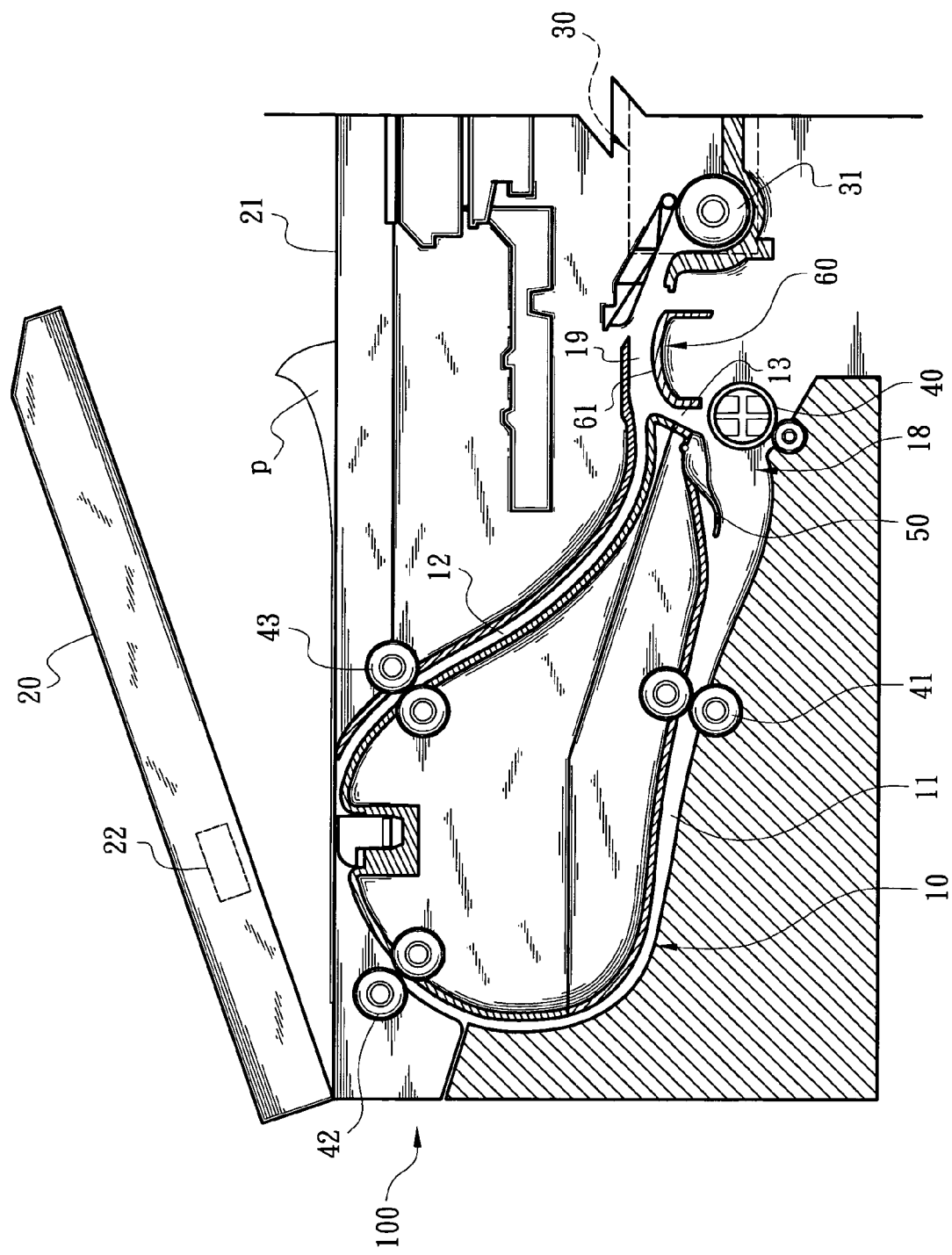
FIG. 4 is a side view of the office machine with both platform-type scanning mode and feeder-type scanning mode of the present invention, showing that a paper is placed on the platform.
Figure 5:
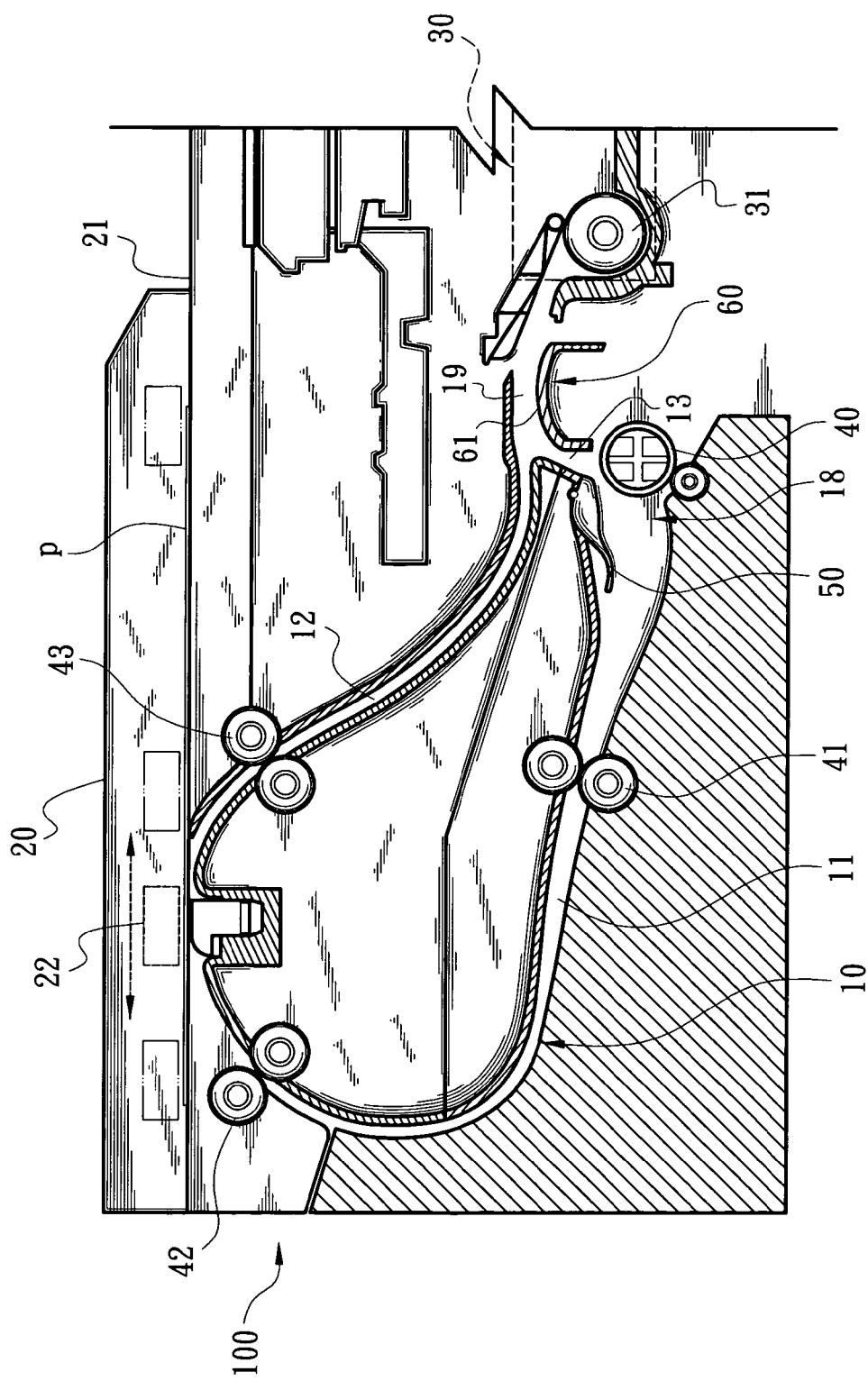
FIG. 5 is a side view according to FIG. 4, showing that the scanning module is reciprocated to scan a paper.

Please refer to FIGS. 4 and 5. The office machine 100 with both platform-type scanning mode and feeder-type scanning mode of the present invention includes a bed section 20 arranged on upper side of the office machine 100 and a platform 21 on which a document or a paper p can be placed. A scanning module 22 is disposed in the bed section 20. The scanning module 22 can be reciprocally driven by a transmission mechanism (not shown) as shown by phantom line of FIG. 5 to scan a document or paper p placed on the platform 21.

The office machine 100 further includes a sheet-feeding path 10 positioned under the bed section 20 and the scanning module 22. A document or a paper p can be fed into the sheet-feeding path 10 to pass through the scanning module 22 which scans the paper p. The sheet-feeding path 10 includes a sheet-feeding passage or a first passage 11, a sheet-releasing passage or a second passage 12 communicating with the first passage 11 and a subsidiary passage 13 positioned between the first and second passages 11, 12.

As shown in FIGS. 4 and 5, a sheet-feeding roller 40 and a reciprocally swinging guide member 50 are arranged in an entrance 18 of the first passage 11. Multiple roller sets 41, 42, 43 are disposed in the sheet-feeding path 10.

In a preferred embodiment, a printing module 30 is arranged at an exit 19 of the second passage 12 as shown by phantom line of FIGS. 4 and 5.

In a preferred embodiment, a table 60 is arranged between the exit 19 of the second passage and the printing module 30. The table 60 has a plane face or a curved face 61 for helping in more smoothly delivering the paper p. Basically, the plane face or curved face 61 is located in a position lower than the position of the second passage 12.

FIGS. 4 and 5 show that a document or a paper p is placed on the platform 21 to be scanned by the office machine 100 in a platform-type scanning mode.

Figure 6:
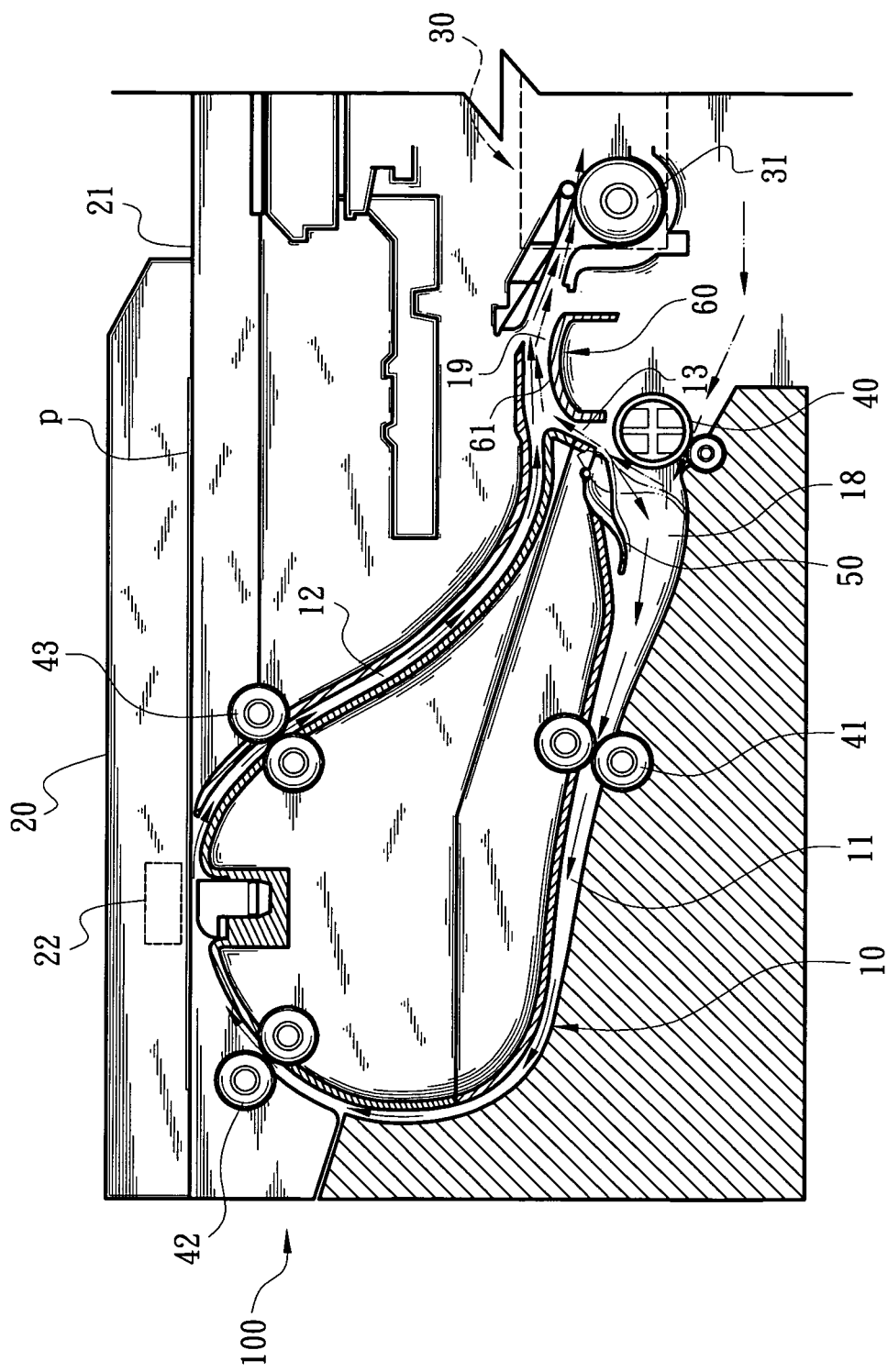
FIG. 6 is a side view according to FIG. 5, showing that a paper is fed into the office machine and scanned/printed.

FIG. 6 shows that a document or a paper p is scanned/printed with the office machine 100 in a feeder-type scanning mode. The solid arrows indicate the delivering path of the document or the paper p. As shown by phantom line of FIG. 6, the guide member 50 is positioned on an upper side of the first passage 11 to unblock the first passage 11. The scanning module 22 is held in a fixed position without reciprocation as shown by phantom line of FIG. 6. The document or paper p is driven by the sheet-feeding roller 40 to go into the first passage 11. After going through the first passage 11 and the roller set 42, the document passes through the scanning module 22 and is scanned by the scanning module 22. Then the document gets into the second passage 12 to be released from the exit 19 thereof. At this time, a first face of the document is scanned. It should be noted that in FIG. 6, in the case that the printing module 30 is set in an off state, the document can pass through the printing module 30 without being printed.

In the case that a second face of the document or paper p is to be scanned as well, after the document is single-face scanned, the document can be driven by a sheet-releasing roller 31 in a reverse direction (leftward according to FIG. 6) into the subsidiary passage 13. Then the document goes into the first passage 11. After going through the first passage 11 and the roller set 42, the document is scanned by the scanning module 22. Then the document gets into the second passage 12 to be released from the exit 19 thereof. At this time, the document or the paper p is double-face scanned.

In FIG. 6, the phantom arrows indicate the delivering path of the paper p to be single-face printed. The guide member 50 swings to lower side of the first passage 11 as shown by phantom line to block the first passage 11. The paper p is driven by the sheet-feeding roller 40 to directly go into the subsidiary passage 13. Then the paper goes through the exit 19 and passes through the printing module 30 to be printed by the printing module 30. At this time, a first face of the paper is printed.

In FIG. 6, the solid arrows indicate the delivering path of the paper p to be double-face printed. After the paper p is single-face printed, the paper p is driven by the sheet-releasing roller 31 in a reverse direction (leftward according to FIG. 6) into the subsidiary passage 13. At this time, the guide member 50 swings back to upper side of the first passage 11 (as shown by solid lines of FIG. 6) to unblock the first passage 11. The arrows indicate that the paper goes through the subsidiary passage 13 into the first passage 11. After going through the first passage 11 and the roller set 42, the paper passes through the scanning module 22 set in an off state. Then the paper goes into the second passage 12 to be released from the exit 19 thereof. Then paper p is double-face printed by the printing module 30.

According to the above arrangement, the office machine with both platform-type scanning mode and feeder-type scanning mode of the present invention has the following advantages:

1. In contrast to prior art, the scanning module 22 of the office machine 100 is arranged on upper side of the sheet-feeding path 10. The office machine 100 can scan papers in both platform-type scanning mode and feeder-type scanning mode without increasing the length of width of the office machine 100.
2. The office machine 100 has a simplified sheet-feeding path 10 in which a document or a paper can be delivered at higher efficiency. With the simplified sheet-feeding path, a paper can be more easily single-face/double-face scanned/printed. The complicated third passage b3 or the sheet-returning passage k2 of the conventional automatic sheet-feeding apparatus is no more necessary.
3. The office machine 100 of the present invention includes less components (such as roller set, guide member, etc.) adapted to the simplified sheet-feeding path.

The above embodiments are only used to illustrate the present invention, not intended to limit the scope thereof. Many modifications of the above embodiments can be made without departing from the spirit of the present invention.

What is claimed is:

1. An office machine with both a platform-type scanning mode and a feeder-type scanning mode, comprising:
   a bed section arranged on an upper side of the office machine;
   a platform on which a document or a paper can be placed;
   a scanning module disposed in the bed section, the scanning module being reciprocally drivable to scan a document or a paper placed on the platform; and
   a sheet-feeding path positioned under the bed section, the sheet-feeding path having at least one scanning position where a first side of a document or a paper can be scanned by the scanning module,
   wherein the sheet-feeding path includes a first passage for feeding the document or paper to the scanning position, a second passage communicating with the first passage for feeding the document or paper away from the scanning position, a subsidiary passage communicating with an exit of the second passage and an entrance of the first passage, and an exit communicating with the exit of the second passage and the subsidiary passage, when a second side of the document or paper is to be scanned, the document or paper of which the first side has been scanned is returned into the subsidiary passage from the exit of the second passage and then transferred into the entrance of the first passage.

2. The office machine with both a platform-type scanning mode and a feeder-type scanning mode as claimed in claim 1, wherein a sheet-feeding roller and a reciprocally swinging guide member are arranged at the entrance of the first passage for enabling passage of a document or paper in one direction between the subsidiary passage and the first passage.

3. The office machine with both a platform-type scanning mode and a feeder-type scanning mode as claimed in claim 1, wherein multiple roller sets are arranged in the sheet-feeding path.

4. The office machine with both a platform-type scanning mode and a feeder-type scanning mode as claimed in claim 1, wherein the exit of the second passage is situated above an entrance to the subsidiary passage.

5. The office machine with both a platform-type scanning mode and a feeder-type scanning mode as claimed in claim 4, wherein a sheet-releasing roller and a printing module are arranged at the exit of the second passage, said sheet-releasing roller is arranged to selectively feed the document or paper from the second passage to the printing module after scanning, and to selectively reverse direction to feed the document or paper back to the first passage through the subsidiary passage when a second side of the document or paper is to be scanned.

6. The office machine with both a platform-type scanning mode and a feeder-type scanning mode as claimed in claim 1, wherein a table is arranged at the exit of the second passage of the sheet-feeding path, the table having a plane face or a curved face, said table further defining on one said subsidiary passage through which the document or paper returns to the first passage.

7. The office machine with both a platform-type scanning mode and a feeder-type scanning mode as claimed in claim 6, wherein the plane face or curved face is located in a position lower than the position of the second passage.

8. An office machine with both a platform-type scanning mode and a feeder-type scanning mode, comprising:
   a bed section arranged on an upper side of the office machine;
   a platform on which a document or a paper can be placed;
   a scanning module disposed in the bed section, the scanning module being reciprocally drivable to scan a document or a paper placed on the platform; and
   a sheet-feeding path positioned under the bed section, the sheet-feeding path having at least one scanning position where a first side of a document or a paper can be scanned by the scanning module, wherein a table is arranged at an exit of the sheet-feeding path, the table having a plane face or a curved face for facilitating passage of the document or paper from the sheet-feeding path, the table further defining a subsidiary passage that leads back to an entrance of the sheet-feeding path for returning the document or paper to the entrance of the sheet-feeding path so that a second side of the document or paper may be scanned.

9. The office machine with both a platform-type scanning mode and a feeder-type scanning mode as claimed in claim 8, wherein the sheet-feeding path includes a sheet-feeding first passage for feeding the document or paper to the scanning position, and a second passage communicating with the first passage for feeding the document or paper away from the scanning position, said subsidiary passage communicating with an exit of the second passage and an entrance of the first passage for returning the document or paper to the second passage back to the first passage in order to scan a second side of the document or paper.

10. The office machine with both a platform-type scanning mode and a feeder-type scanning mode as claimed in claim 9, wherein a sheet-feeding roller and a reciprocally swinging guide member are arranged at the entrance of the first passage for enabling passage of a document or paper in one direction between the subsidiary passage and the first passage.

11. The office machine with both a platform-type scanning mode and a feeder-type scanning mode as claimed in claim 8, wherein multiple roller sets are arranged in the sheet-feeding path.

12. The office machine with both a platform-type scanning mode and a feeder-type scanning mode as claimed in claim 8, wherein the second passage has an exit.

13. The office machine with both a platform-type scanning mode and a feeder-type scanning mode as claimed in claim 12, wherein a sheet-releasing roller and a printing module are arranged at the exit of the second passage.

14. The office machine with both a platform-type scanning mode and a feeder-type scanning mode as claimed in claim 8, wherein the plane face or curved face is located in a position lower than the position of the second passage.

\* \* \* \* \*